United States Patent [19]

Frommer et al.

[11] Patent Number: 5,573,665

[45] Date of Patent: Nov. 12, 1996

[54] THREE CHAMBER CONSECUTIVE FLOW WATER TREATMENT DEVICE

[75] Inventors: Moshe A. Frommer, Rehovot; Israel Dalven, Emmanuel, both of Israel

[73] Assignee: Purotech Ltd., Tel-Aviv, Israel

[21] Appl. No.: 382,624

[22] Filed: Feb. 2, 1995

[51] Int. Cl.$^6$ .................................................. B01D 24/18
[52] U.S. Cl. ......................... 210/232; 210/252; 210/259; 210/266; 210/282; 210/286; 210/287; 210/753; 210/205
[58] Field of Search ..................................... 210/264, 281, 210/282, 283, 252, 285, 259, 286, 232, 198.1, 205, 266, 287, 753

[56] References Cited

U.S. PATENT DOCUMENTS

| | | | |
|---|---|---|---|
| 300,612 | 6/1884 | Kester | 210/286 |
| 359,259 | 3/1887 | Kaiser | 210/285 |
| 671,684 | 4/1901 | Xander | 210/282 |
| 1,090,283 | 3/1914 | Crandall | 210/286 |
| 2,369,915 | 2/1945 | Quinn | 210/282 |
| 3,342,340 | 9/1967 | Shindell | 210/282 |
| 4,072,615 | 2/1978 | McConnell | 210/282 |
| 5,041,219 | 8/1991 | Strand et al. | 210/286 |
| 5,116,502 | 5/1992 | Ferguson | 210/282 |
| 5,340,478 | 8/1994 | Strand et al. | 210/286 |

OTHER PUBLICATIONS

Multi–Filter GmbH, Hamburg, Fed. Republic of Germany (1992).
"DynaFlow Series" Filters, from Hydro–Flow Filtrations Systems, Inc., Corona, California (1992).

*Primary Examiner*—Robert J. Popovics
*Attorney, Agent, or Firm*—Edwin D. Schindler

[57] ABSTRACT

A water purification through-flow device which comprises a cylindrical shell which is divided lengthwise into two or more sectors, separated from each other by partitions, with a cover fitting one end of the shell, in which cover there is provided an inlet for water which is to be purified. Depending on the number of sectors, the outlet is provided in the same cover if there are two sectors, and in the other cover if there are three sectors: the water flowing through each of the sectors one after the other. The individual sectors may contain the same purification substance, or different sectors can contain different ones. There may be provided mechanical filtration means for the water passing through the device, and there may be provided means for closing the various sectors during storage.

5 Claims, 1 Drawing Sheet

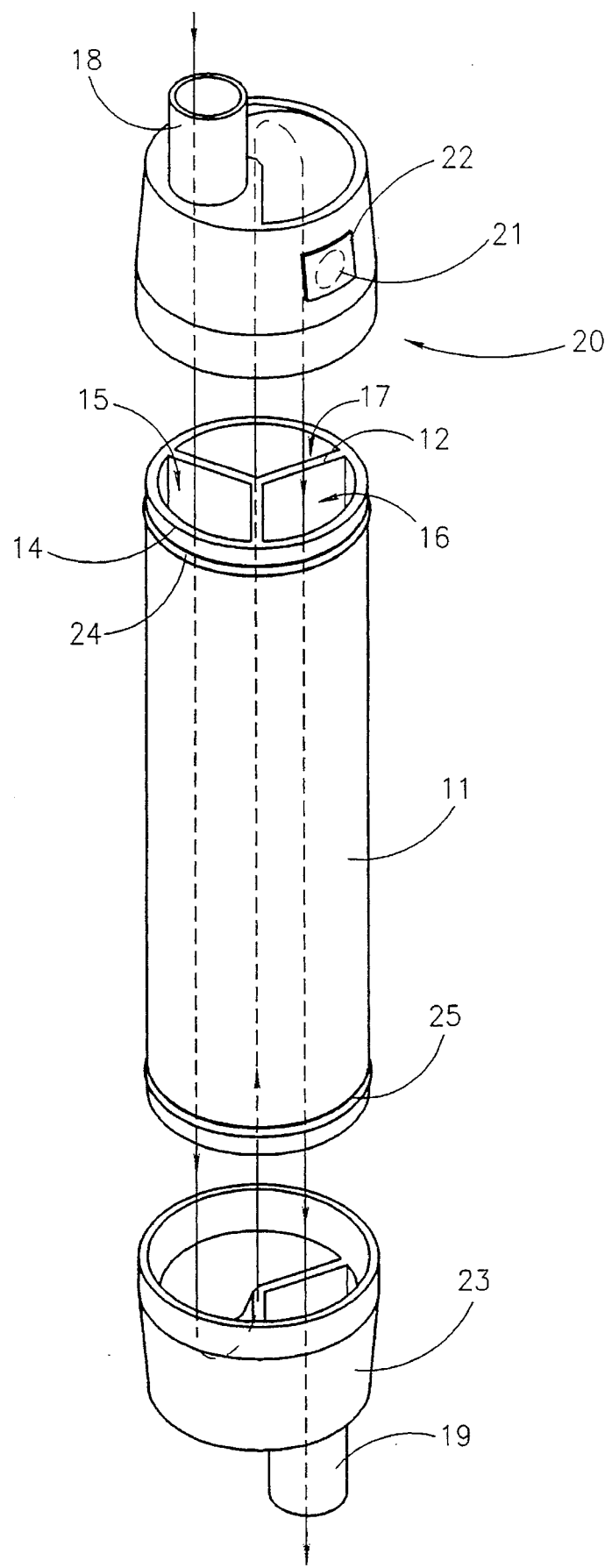

5,573,665

THREE CHAMBER CONSECUTIVE FLOW WATER TREATMENT DEVICE

FIELD OF THE INVENTION

A filter cartridge is provided, generally of tubular cross-section, through which water to be purified for household and similar uses, which provides a path for a meandering flow of the water along the length of the tube, and back, possibly also a third or even fourth time, through a number of sectors, which may be of equal or unequal area, so that the water to be purified passes through more than one purification medium.

BACKGROUND OF THE INVENTION

Household and industrial filtration and purification of water is an old and well-established process. In recent years however, with growing water quality problems worldwide, and an increase in the number of methods available for treating water, the demand for filters capable of removing a variety of water impurities has increased significantly. Constraints of cost and space, especially for filters designed for household drinking and cooking needs, make the incorporation of several purification methods in a single standard size cartridge a necessity for their widespread use. Examples of complementary purification methods are sediment filtration, activated carbon absorption of organic compounds, redox removal of chlorine and heavy metals, and microbial disinfection by iodinated resins.

This need for multiple chamber standard cartridges has recently been recognized, both for the improved efficiency achieved by an increase in the length to diameter ratio of the column of the purifying material and for the ability to incorporate several media in a single cartridge.

No practical device capable of meeting commercial needs is known from the prior art.

One device which attempted to meet this need has been produced by Multi-Filter GmbH, and consists of 2or 3concentric chambers separated by precision molded cylinders. The product has not been a success due to its high cost, the fixed size ratio of the chambers and the large percentage (–27 %) of the volume occupied by the chamber walls in a three chamber configuration. This compares with –10 % in a single chamber cartridge. Thus, much of the advantages accrued due to the improved flow efficiency and multiple media capability are lost due to the low volume of purification media capable of being incorporated in such a filter.

Another device, advertised by the Hydro-Flow Corporation, as "Tri-Dynaflow High Performance 3-way Filtration" for improved efficiency single medium filtration, has not been further marketed.

Thus, a practical multi-media cartridge design is not yet known as an article of commerce, although such a device is of considerable interest to the home water filtration industry.

SUMMARY OF THE INVENTION

The invention relates to a water purification through-flow device comprising an elongated cylindrical shell, divided at its inside along its entire length into at least two sectors, by one or more partitions which extend from the center of the shell, a cover tightly fitting one end of the shell, provided with an inlet, another cover tightly fitting the other end of the shell, an outlet located in one of the two covers according to the number of sectors, the conduit or water stream being such that the stream passes consecutively through all the sectors, which contain at least one purification means.

According to one embodiment the internal space is divided by three walls extending along the entire length of the shell, connected with each other at the center of the shell, defining three sectors of equal or different cross-section and preferably the shell is a tubular shell.

In most embodiments there are provided passages in the covers or close to the end of the shell, permitting water flow from one section to the neighbouring one and means are provided for closing the openings between different sectors during storage, and which are removable before use.

According to a preferred embodiment each of the sectors contains a different purification substance, so that one sector contains a certain purification substance, and the other sector or sectors a different purification substance. There may also be provided mechanical filtration means close to the water inlet.

In an upright device the water flows downwards in the first sector, upwards in the second, downwards in the third and the exit port is in the lower cover.

In the following there is described a multi chamber cartridge for the purification and decontamination of water, which permits the consecutive flow-through through more than one filter/decontamination medium. The novel device is provided in cartridge form, and the cartridge is advantageously divided into a number of distinct compartments, separated between each other prior to use, where in each compartment there may be provided a different decontamination medium. There may be further provided one or more prefilters or filter media. Preferably the cartridge is in the form of an elongated tubular chamber, subdivided into a number of sectors, of identical or different cross-section in which there are provided identical or different decontamination media, the arrangement being such that the flow of water passes consecutively through the sectors of the cartridge.

The invention will be described with reference to a cartridge subdivided into three segments, which may be of different cross-section, separated from each other by a wall, provided with inlet and outlet means, and where the arragement is such that the water stream to be purified passes consecutively through all the compartments, in a meandering flow path.

Thus, the goal of the invention is a design for a multi chamber cartridges capable of being produced inexpensively, possessing superior flow characteristics to that of single chamber cartridge and also allowing the incorporation of more than one different purification media in a single cartridge, in addition to an optional prefilter.

An additional goal is a design allowing flexibility in the ratio of volumes of the different chambers. A further goal is the ability to isolate hermetically the chambers from each other during shelf storage, prior to use. This latter feature is important, for example, to allow the use of iodine containing disinfecting resins together with activated carbon in the same cartridge without cross-contamination of the carbon by iodine vapors during shelf storage.

The device consists of a cartridge consisting of three parts, an inlet head, an outlet head and a body. The body is formed by continuous extrusion to form a profile describable as a circular tube, divided radially from the center by three walls, connected at the center, into three pie-shaped segments of any desired proportion, but normally in a ratio where the largest is not more than twice the smallest. Preferably the complete profile is produced in a single extrusion step, but the cylindrical tube and the radial separator can be produced separately, without altering the essence of the disclosure. The filter body can be cut to any desired length, providing considerable savings over the use of individual molds.

The inlet head is formed also from an essentially inert plastic such as polyethylene, polypropylene or polyethylene terephthalate (PET) in such a way to join with all the filter body walls and allow water from outside the filter to enter one segment only (segment A). In one configuration, where the filter operates without a prefilter joined to it in the same filter housing, the means to permit the entry of water to be treated is located near the circumference of the cylindrical filter and can be a series of slits in the head, which retain the filter medium within the filter housing, while permitting free passage of water.

Other similar arrangements can accomplish the same purpose. In another configuration, where a standard-type cylindrical prefilter is joined to the inlet head, the means to permit the entry of water to be treated is located near the center of the cylindrical filter of the current disclosure. The inlet head thus becomes identical to the exit head, as described below, permitting additional savings in capital cost. The inlet head further contains a series of small holes in the part of the head joining the wall of the filter body separating segments B & C, allowing water to pass from segment B to C, but retaining the filtration medium.

The outlet head is similar to (and in the second configuration described above, identical to) the inlet head. The means provided to allow treated water to exit the filter is located near the center of the filter outlet head. This in accordance with the requirements of standard filter housings. The design concept is equally appropriate, with suitable modification, to other cartridge designs. The exit port is connected to segment C and the small holes as described above, are located so as to permit water to flow between segments A & B.

In either or both the inlet and/or the outlet heads, there is a slit provided in the section containing the small holes, opening to the outside of the head and allowing a small sliding "door" to be inserted. When left in the storage position, the "door" blocks the holes. When inserted fully, (or alternatively, extended fully) the "door " is "opened ", allowing water to flow though the holes and pass from one segment to the next and additionally blocking water from existing or entering the filter body through the slit.

An alternate embodiment of the invention has the "door" in the open position containing a screen which permits water flow, but prevents of the filtration media from one segment to the next. This eliminates the need for small holes in the separating wall of the heads, and instead permits the use of "windows" opening to the sliding "door" from each side. This may permit a simplification of the production mold.

Thus in a typical configuration, containing iodinated disinfecting resin, GAC and KDF filtration materials respectively in segments A, B & C, the outlet head only would require the "door" and slot. This feature and a simple cap over the inlet head would provide for complete isolation of the iodinated resin during shelf storage prior to use.

A triple compartment decontamination cartridge for water purification is described by way of example with reference to the enclosed schematical drawing, which is not according to scale, and which is a perspective view of an opened up cartridge of the invention.

As shown in this figure, the cartridge comprises a tubular shell 11 which is subdivided by partitions 12, and 14 into sectors 15, 16 and 17, extending from one end of the shell to the other. There is provided a water inlet 18, and the water flows from inlet 18 downwards via sector 15, upwards via sector 16 and again downward via sector 17, to exit 19. The upper cover 20 is divided so as to direct the water flow as set out above, and is also provided with an opening 21 which can be closed by sliding door 22, and which separates sectors 16 from 17. The lower cover 23 is similarly divided, and provided with an outlet 19. Both the upper and lower cover are connected to the tubular member via a tightly fitting O-ring, 24 and 25, respectively. Slidable covers separate the chemicals in the compartments from each other to prevent any interaction during storage and prior to actual use.

We claim:

1. A water purification through-flow device, comprising;
   an elongated cylindrical shell disposed about a central axis, having a first end and a second end defining an internal volume, said internal volume being divided, along its entire axial length, into three sectors, by three walls extending along the entire axial length of said cylindrical shell and being connected along said central axis;
   at least one purification means being contained within each of said sectors;
   a first cover at said first end of said cylindrical shell, said first cover defining an inlet being in fluid communication with a first of said three sectors when placed on said first end of said cylindrical shell;
   a second cover fitting said second end of said cylindrical shell, said second cover defining an outlet being in fluid communication with a third of said three sectors when placed on said second end of said cylindrical shell, said first cover additionally defining a fluid passage placing a second of said sectors in fluid communication with said third sector, and said second cover defining a fluid passage placing said first sector in fluid communication with said second sector such that water entering said inlet consecutively passes through the purification means in said first sector, the purification means in said second sector , the purification means in said third sector and through said outlet.

2. The water purification through-flow device according to claim 1, wherein said first and second covers act as means for closing said sectors during storage, said means for closing being removable prior to use.

3. The water purification through-flow device according to claim 1, wherein each of said sectors contains a different purification means.

4. The water purification through-flow device according to claim 1, wherein one of said sectors contains a first purification means and the other two of said sectors contain a second different purification means.

5. The water purification through-flow device according to claim 1, further comprising mechanical filtration means adjacent said inlet.

* * * * *